Figure 1:
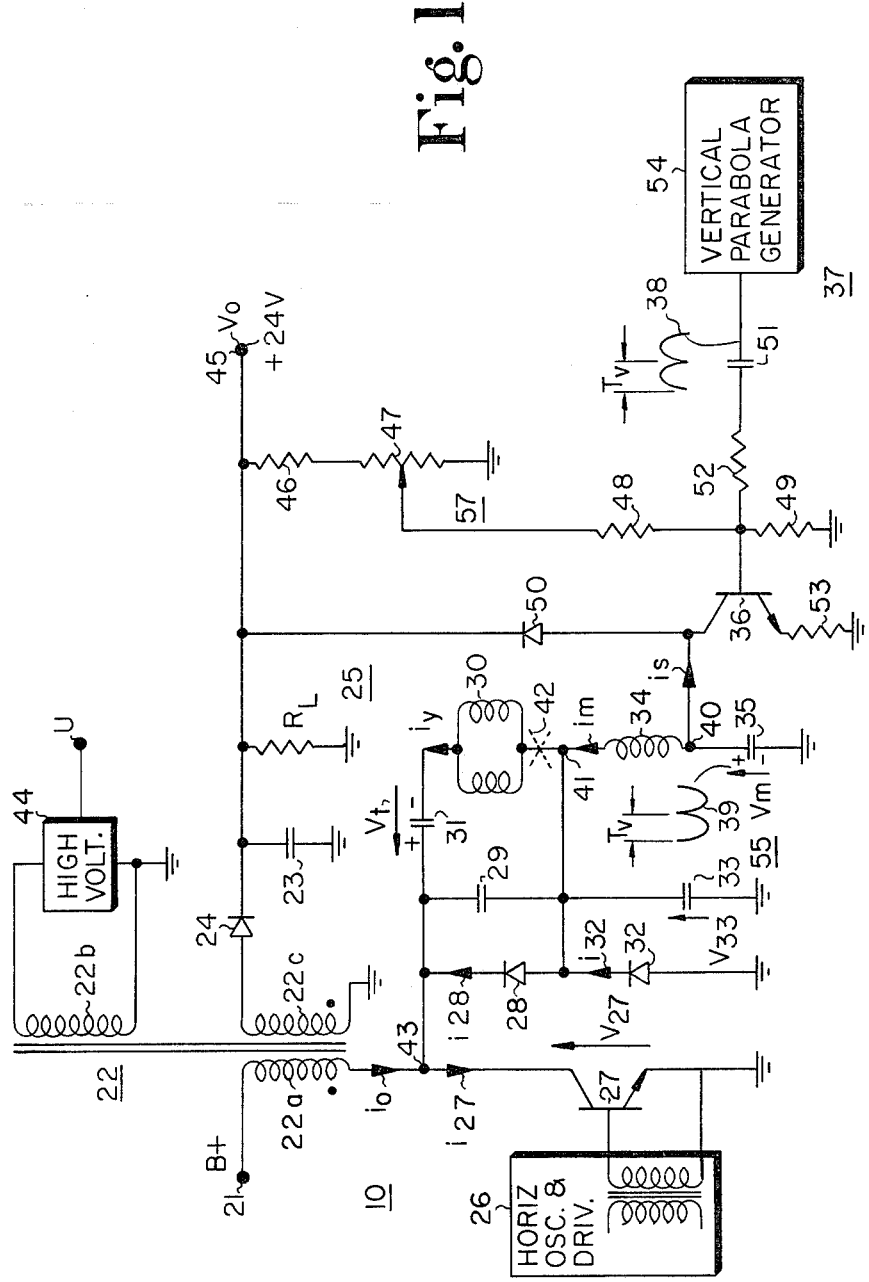

United States Patent [19]

Knight

[11] 4,329,729
[45] May 11, 1982

[54] SIDE PINCUSHION MODULATOR CIRCUIT WITH OVERSTRESS PROTECTION

[75] Inventor: Peter R. Knight, Indianapolis, Ind.

[73] Assignee: RCA Corporation, New York, N.Y.

[21] Appl. No.: 162,211

[22] Filed: Jun. 23, 1980

[51] Int. Cl.³ .............................................. H02H 3/20
[52] U.S. Cl. ....................................... 361/91; 361/56; 358/245; 315/399; 315/393
[58] Field of Search ....................... 361/56, 91; 358/23, 358/35, 173, 74, 243, 245, 190; 315/399, 393, 407, 408, 410

[56] References Cited

U.S. PATENT DOCUMENTS

| | | | |
|---|---|---|---|
| 3,302,056 | 1/1967 | Preisig | 361/56 |
| 3,506,844 | 4/1970 | Rohloff | 361/56 |
| 3,894,269 | 7/1975 | Ahrens | 361/56 X |
| 3,906,305 | 9/1975 | Nillesen | 315/399 |

*Primary Examiner*—Patrick R. Salce
*Attorney, Agent, or Firm*—Eugene M. Whitacre; Paul J. Rasmussen; Joseph Laks

[57] ABSTRACT

A side pincushion corrected deflection circuit for a television receiver includes a deflection winding, a trace capacitor and a first switch for generating scanning current in the deflection winding. A modulator circuit includes a modulator inductor and capacitor and a second switch for generating a sawtooth modulator current in the inductor. The trace and modulator capacitors are charged from a B+ operating voltage source through the primary winding of a flyback transformer. A transistor stage in the modulator circuit shunts current away from the modulator capacitor to control the modulator and trace capacitor voltages. A vertical rate bias voltage is applied to the transistor stage and varies the shunt current at a vertical rate in a parabolic manner to provide side pincushion correction. Under fault conditions, such as an open-circuited deflection winding or trace capacitor, the modulator capacitor voltage tends to undesirably increase above the peak voltage developed under normal operating conditions. To prevent overstressing the modulator transistor stage, a diode clamp is coupled between the modulator capacitor and a source of reference voltage, thereby preventing the modulator capacitor voltage from substantially exceeding the reference voltage level.

5 Claims, 4 Drawing Figures

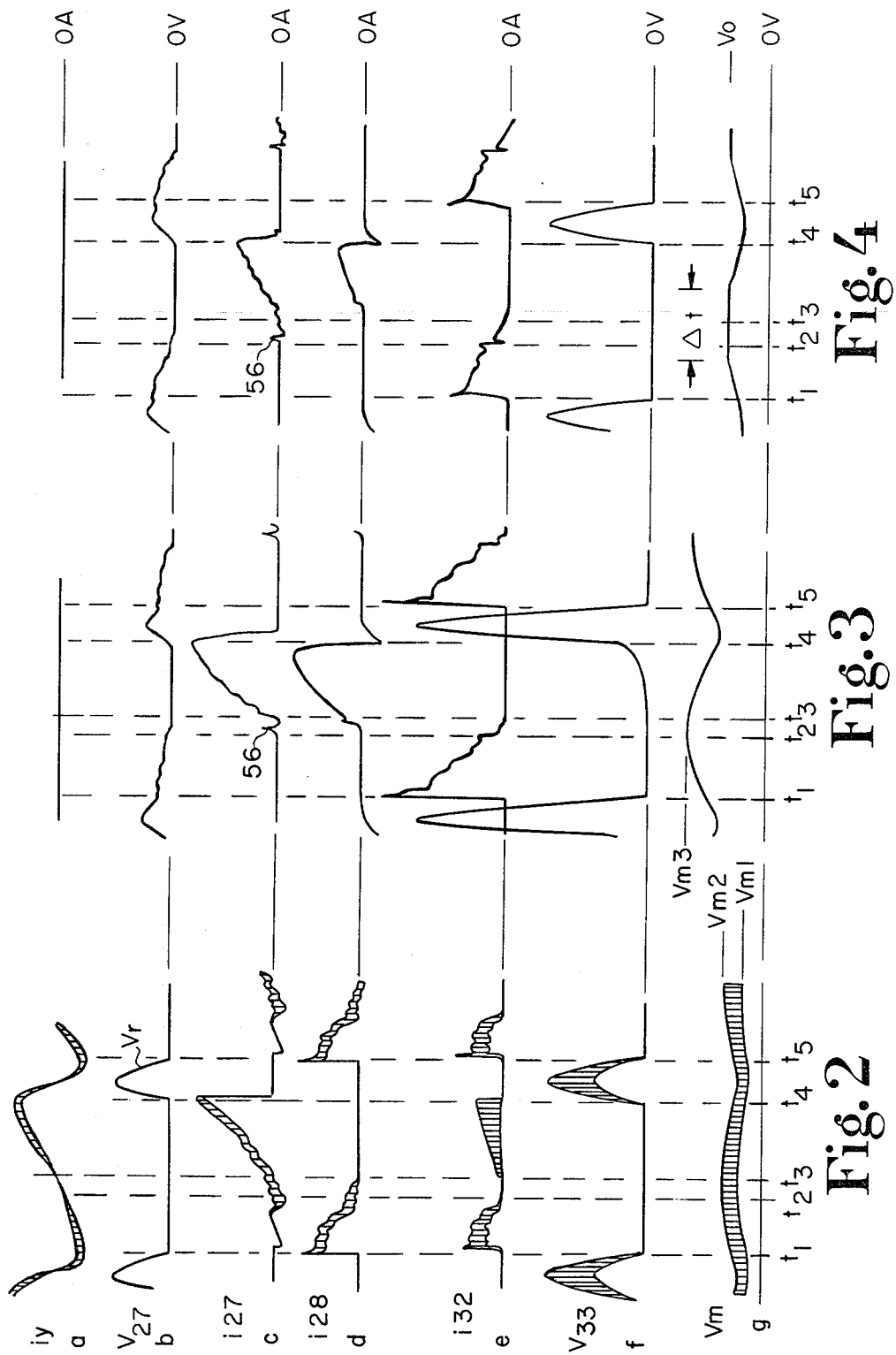

SIDE PINCUSHION MODULATOR CIRCUIT WITH OVERSTRESS PROTECTION

This invention relates to side pincushion correction for a deflection circuit.

In a television receiver, the electron beams inside the television receiver picture tube are deflected by magnetic fields generated by sawtooth deflection currents flowing in horizontal and vertical deflection windings. The deflected electron beams scan a raster pattern on the picture tube phosphor screen. The raster pattern, without correction, may display various geometric distortions such as side or east-west pincushion distortion and top and bottom or north-south pincushion distortion.

To correct side pincushion distortion, the peak-to-peak horizontal deflection trace current in the horizontal deflection winding is modulated at a vertical rate in a parabolic manner. For large deflection angle picture tubes, such as 100° or 110° deflection angle picture tubes, such parabolic modulation may be accomplished by a modulator circuit, such as a diode modulator, coupled to the horizontal deflection winding.

In a typical diode modulator circuit, the deflection trace capacitor is coupled to the deflection winding and a modulator inductor is coupled to a modulator capacitor. The two capacitors are charged from a B+ operating voltage supply through a flyback transformer primary winding. A deflection switch and modulator switch are provided in order to generate horizontal rate sawtooth currents in the deflection winding and in the modulator inductor. During horizontal retrace, the horizontal deflection winding and the modulator inductor resonate with respective retrace capacitors for providing flyback of the sawtooth currents.

A modulator control circuit coupled to the modulator capacitor varies the voltage across the capacitor at a vertical rate in a parabolic manner. As a result, the trace voltage across the trace capacitor varies in a similar fashion, thereby providing side pincushion correction. The modulator circuit typically includes a transistor stage having a main current conducting path which shunts the modulator capacitor. By controlling the amount of current shunted from the modulator capacitor, the transistor stage controls both the modulator and trace voltages. Applying to the transistor stage a vertical rate bias signal which varies in a parabolic manner, varies in a like manner the shunt current and thus the modulator and trace voltages to provide the required side pincushion correction.

Under fault operating conditions, such as an open-circuited or unplugged deflection winding or trace capacitor, the voltage across the modulator capacitor tends to increase to levels substantially greater than the peak modulator voltage developed under normal operating conditions. This increased modulator capacitor voltage is applied to the modulator circuit control stage, producing an overvoltage stress condition and possible failure of the transistor components in the control stage.

Some modulator transistor stages are configured as emitter-followers with negative feedback of the modulator voltage to maintain the parabolic shape of the vertical rate modulator capacitor voltage. Under fault operating conditions, such emitter-follower circuits tend to shunt an undesirably large amount of current from the modulator capacitor, producing undue dissipation in the transistor stage. Furthermore, even with negative feedback, the modulator capacitor voltage may still tend to undesirably increase under fault operating conditions.

A feature of the invention is to prevent overstressing the modulator circuit transistor stage under fault operating conditions. A clamping circuit is coupled to the modulator capacitor and to a source of reference voltage to bypass current from the modulator capacitor when the voltage across the capacitor exceeds a predetermined level. In a specific embodiment, the clamping circuit comprises a diode which clamps the modulator capacitor voltage at approximately the reference voltage level under fault conditions. Overvoltage stressing of the transistor stage in the modulator circuit is thus reduced. Furthermore, with excess current flowing in the diode clamp circuit rather than in the modulator circuit transistor stage, overcurrent stressing of the transistor stage is also reduced.

FIG. 1 illustrates a deflection circuit with side pincushion correction and overstress protection embodying the invention; and FIGS. 2–4 illustrate waveforms associated with the operation of the circuit of FIG. 1.

In the horizontal deflection circuit 10, illustrated in FIG. 1, a B+ operating voltage developed at a terminal 21 is applied to a primary winding 22a of a horizontal output or flyback transformer 22. Primary winding 22a is coupled to a switching arrangement at the collector of a horizontal output transistor 27 at a terminal 43. Coupled across terminal 43 and a terminal 41 is the series arrangement of an S-shaping or deflection trace capacitor 31 and a horizontal deflection winding 30, and also a deflection retrace capacitor 29 and a damper diode 28.

A diode modulator circuit 55 is coupled to horizontal deflection winding 30 to provide side pincushion correction to the horizontal deflection current $i_y$. Diode modulator 55 includes a series arrangement of a modulator inductor 34 and a modulator capacitor 35, with modulator inductor 34 coupled to horizontal deflection winding 30 at terminal 41. Paralleling the series arrangement of the modulator inductor and capacitor is a modulator retrace capacitor 33 and another switch, a modulator diode 32.

Trace capacitor 31 and modulator capacitor 35 are charged from the B+ operating terminal 21 through flyback transformer primary winding 22a, thereby establishing a trace voltage $V_t$ across capacitor 31 and a modulator voltage $V_m$ across capacitor 35.

The average value of the modulator voltage $V_m$, when averaged over a substantial number of horizontal deflection cycles, is controlled by a shunt transistor 36 coupled to modulator capacitor 35 at a terminal 40. A bias resistor 53 is coupled between the emitter of controllable shunt transistor 36 and ground. Varying the amount of shunt current $i_s$ shunted from modulator capacitor 35 to the collector of transistor 36 varies the average value of the modulator voltage $V_m$ developed across capacitor 35. Shunt transistor 36 is part of a modulator control circuit 37 which includes a conventional vertical parabola generator 54 and a raster width adjusting circuit 57.

Vertical parabola generator 54 applies a vertical rate, $1T_V$, parabolically shaped bias signal 38 to the base of transistor 36 through a capacitor 51 and a resistor 52. The average value of the modulator voltage $V_m$ thus also varies at a vertical rate in a parabolic manner, as illustrated schematically by the waveform 39 of FIG. 1.

With the average modulator voltage varying at a vertical rate in a parabolic manner, the average value of the trace voltage $V_t$ developed across deflection trace capacitor 31 will also vary at a vertical rate in a parabolic manner, reaching a maximum value at the center of vertical scan, as required for providing side pincushion correction to the horizontal deflection current $i_y$.

Adjustable width control circuit 57 comprises voltage dividing resistors 46–49, with the base of transistor 36 being coupled to the junction of resistors 48 and 49 and with resistor 48 being coupled to the wiper arm of resistor 47. Circuit 57 generates an adjustable DC base current in controllable shunt transistor 36 to control the DC level of the shunt current $i_s$, thereby providing raster width control.

During the first part of the trace interval of a horizontal deflection cycle, after time $t_1$ of FIGS. 2a–2g, both damper biode 28 and modulator diode 32 are conducting as illustrated by the damper diode current $i_{28}$ of FIG. 2d and the modulator diode current $i_{32}$ of FIG. 2e. The trace voltage $V_t$ is applied across deflection winding 30 to produce the positive-going, S-shaped, sawtooth horizontal deflection current $i_y$, as illustrated in FIG. 2a. Similarly, the modulator voltage $V_m$, illustrated in FIG. 2g, is applied across modulator inductor 34 to produce a positive-going, sawtooth modulator current $i_m$ in modulator inductor 34.

With controllable shunt transistor 36 varying the shunt current $i_s$ at a vertical rate in a parabolic manner, the modulator voltage $V_m$ varies in a like manner between the upper and lower waveforms of FIG. 2f, as schematically represented by the vertical line shading between the two waveforms. With the voltage $V_m$ modulated at a vertical rate in a parabolic manner, the trace voltage $V_t$ is likewise modulated, producing a vertical rate modulation of the horizontal deflection current $i_y$, as illustrated schematically in FIG. 2a by the vertical line shading separating the two waveforms of FIG. 2a. Side pincushion correction is thereby provided.

As previously mentioned, during a first part of the trace interval of a horizontal deflection cycle, after time $t_1$, both damper diode 28 and modulator diode 32 are conducting, respectively; the horizontal deflection current and the modulator inductor current, as illustrated in FIGS. 2d and 2e. Another component of each of the diode currents is the current $i_0$ flowing from flyback transformer primary winding 22a.

Near time $t_2$, horizontal oscillator and driver 26 applies a forward biasing voltage across the base and emitter electrodes of horizontal output transistor 27. Horizontal output transistor 27 then takes over current conduction from modulator diode 32, with the transistor operating in a reverse base-to-collector conduction mode, as illustrated in FIG. 2c by the negative collector current $i_{27}$ flowing between times $t_2$–$t_3$, and as illustrated in FIG. 2d by the absence of current $i_{32}$ in diode 32 during this interval. Assuming horizontal deflection current $i_y$ is greater in magnitude than modulator current $i_m$, modulator diode 32 will conduct the difference current $i_y$–$i_m$ after time $t_3$, near the center of the horizontal trace interval, when both the horizontal deflection current $i_y$ and the modulator current $i_m$ are positive, as illustrated in FIG. 2e.

Somewhat prior to time $t_4$, horizontal oscillator and driver 26 applies a reverse bias voltage to the base and emitter electrodes of horizontal output transistor 27. Transistor 27 becomes cut off at time $t_4$, initiating the horizontal retrace interval which occurs approximately between times $t_4$–$t_5$. During the horizontal retrace interval, horizontal deflection winding 30 and deflection retrace capacitor 29 resonate to produce a retrace pulse voltage across capacitor 29. Similarly, modulator inductor 34 and modulator retrace capacitor 33 undergo a half cycle of resonant oscillation to provide flyback of the modulator current $i_m$. The values of modulator inductor 34 and modulator retrace capacitor 33 are selected so as to obtain the same frequency of oscillation as the deflection retrace frequency.

The retrace pulse voltage $V_{33}$ developed across retrace capacitor 33 is illustrated in FIG. 2f between times $t_4$–$t_5$. The retrace pulse voltage developed at the collector of horizontal output transistor 27 at terminal 43 comprises the sum of the retrace pulse voltages developed across the deflection and modulator retrace capacitors and is illustrated in FIG. 2b as the pulse waveform $V_r$. The retrace pulse $V_r$, when using a diode modulator correction circuit 55, remains relatively unchanged in amplitude over vertical scan, as illustrated in FIG. 2b by the absence of vertical rate modulation of the retrace pulse waveform.

The retrace pulse voltage $V_r$ is applied to the primary winding 22a of flyback transformer 22 and is stepped up by a high voltage winding 22b. A high voltage circuit 44 coupled across flyback transformer high voltage winding 22b derives a DC ultor accelerating potential at a terminal U from the high voltage developed across winding 22b. Other DC supply voltages, such as a $+V_0$ supply developed at a terminal 45, may be obtained from other windings of the flyback transformer such as winding 22c. The voltage developed across flyback transformer winding 22c is rectified during the horizontal trace interval, for example, by a diode 24 and filtered by a capacitor 23 to produce the voltage $V_0$ at terminal 45. The voltage $V_0$ is used as a supply voltage for such load circuits as the vertical deflection and the signal processing circuits, collectively shown in FIG. 1 as a load $R_L$.

Due to the S-shaping requirements for the horizontal deflection current $i_y$, the capacitance values of the deflection trace capacitor 31 and the modulator capacitor 35 are such as to produce horizontal rate, $1/T_H$, variations in the voltages developed across the two capacitors. As illustrated in FIG. 2g, the modulator voltage $V_m$ reaches a maximum each horizontal deflection cycle near time $t_3$, the center of the horizontal trace interval. With side pincushion modulation of the voltage $V_m$ also occurring, the maximum voltage attained each horizontal deflection cycle varies at a vertical rate in a parabolic manner between the two levels $V_{m1}$ at the center of vertical scan and the level $V_{m2}$ at the top and bottom of vertical scan.

Under certain fault operating conditions of horizontal deflection circuit 10, the voltage developed across modulator capacitor 35 may substantially increase to values which will overstress circuit components in the diode modulator circuit 55 or in other parts of horizontal deflection circuit 10. Consider a situation where the horizontal deflection winding 30 or the deflection trace capacitor 31 open-circuits. Such a situation is schematically illustrated in FIG. 1 by the dashed-line "X" mark 42 across the conductor line connecting terminal 41 with horizontal deflection winding 30. The circuit branch containing horizontal deflection winding 30 and trace capacitor 31 is no longer operatively connected to the remainder of the horizontal deflection circuit. No deflection current $i_y$ flows under such a fault condition, as illustrated in FIG. 3a.

FIGS. 3a–3g illustrate the open-circuit fault condition waveforms of the currents and voltages which under normal operating conditions are illustrated by respective FIGS. 2a–2g, assuming for the moment that the diode 50 circuit branch is omitted. Under an open-circuited fault condition, where the circuit branch that includes horizontal deflection winding 30 is disconnected from the remainder of the horizontal deflection circuit 10, the modulator capacitor voltage $V_m$ increases substantially as illustrated in FIG. 3g. The modulator voltage of $V_m$ is greater than the maximum modulator capacitor voltage $V_{m2}$ developed under the normal operating conditions of FIG. 2g and reaches a relatively large peak value of $V_{m3}$, as illustrated in FIG. 3g. Since the modulator voltage $V_m$ is applied to the controllable shunt transistor 36, the substantial increase in modulator voltage occurring under fault operating conditions may overstress the transistor, causing failure of the device.

Vertical rate modulations of the waveforms of FIGS. 3a–3g is absent or greatly reduced under fault operation because the load impedance coupled to modulator control circuit 37 is considerably lowered due to the substantial difference in resonant frequencies of the deflection and modulator retrace circuits.

Other components of horizontal deflection circuit 10 may also be overstressed. As illustrated in FIG. 3f, the retrace pulse voltage $V_{33}$ developed across modulator retrace capacitor 33 is of much greater amplitude under fault conditions due to the increase in average modulator voltage $V_m$. Greater voltage stress on modulator diode 32 is thus applied. Also, under fault operating conditions, damper diode 28 conducts during the second half of the horizontal trace interval rather than the first half as illustrated in FIG. 3d between times $t_3$–$t_4$. Horizontal output transistor 27 becomes cut off at time $t_4$, with time $t_4$ being the beginning of what would normally be the horizontal retrace interval $t_4$–$t_5$. The inductance of flyback transformer primary winding 22a resonates with both retrace capacitors 29 and 33 to develop a pulse voltage at terminal 43 between times $t_4$–$t_5$, as illustrated in FIG. 3b. Due to stored charge effects, damper diode 28 conducts for a significant interval at the beginning of retrace before becoming cut off, thereby undesirably dissipating energy and stressing the device.

Furthermore, after time $t_3$, horizontal output transistor 27 tends to come out of saturated conduction, as illustrated by the increasing voltage $V_{33}$ of FIG. 3f between times $t_3$–$t_4$, resulting in increased dissipation in output transistor 27. Output transistor 27 tends to come out of saturation because of the reduced base drive to the transistor and the increased collector current. The base drive is a function of the power supply voltage provided to the base drive circuitry within horizontal oscillator and driver 26. This power supply voltage is typically obtained by rectifying the retrace pulse voltage developed across a secondary winding of horizontal flyback transformer 22. Under fault operation, the retrace pulse amplitude, power supply voltage, and the horizontal output transistor base drive are all reduced.

The frequency of resonant oscillation of flyback transformer primary winding 22a and retrace capacitors 29 and 33 is substantially less than the horizontal retrace frequency. Thus, at the end of the flyback of modulator inductor 34 and modulator capacitor 33, at times $t_5$ or $t_1$ of FIGS. 3a–3g, the energy stored in retrace capacitor 29 from flyback transformer primary winding 22a has not been completely returned to the winding. Thus, at time $t_1$ when modulator diode 32 becomes conductive, deflection retrace capacitor 29 is still charged to a substantial level as indicated by the nonzero voltage $V_{27}$ at terminal 43 in FIG. 3b. During the first portion of the trace interval between times $t_1$–$t_2$, deflection retrace capacitor 29 is slowly discharged by primary winding 22a, as illustrated by the slowly decreasing voltage $V_{27}$ between times $t_1$–$t_2$. At time $t_2$, horizontal output transistor 27 becomes conductive and capacitor 29 is rapidly discharged thereafter, as indicated by the small spike of current 56 in the collector current waveform $i_{27}$ of FIG. 3c.

Because the resonant frequency of the current oscillation in primary winding 22a during the retrace interval $t_4$–$t_5$ is less than the resonant frequency of modulator inductor 34 and modulator retrace capacitor 33, not all the energy supplied to the modulator retrace circuit from primary winding 22a can be returned to the primary winding before the retrace interval ends and modulator diode 32 begins conducting. Thus, modulator capacitor 35 will become charged to a substantially greater voltage under fault conditions than under normal operating conditions, as may be noted by comparing the modulator voltage $V_m$ of FIGS. 3g and 2g.

The undesirable increase in modulator voltage under fault conditions is avoided by inclusion of an overstress protection arrangement according to the invention in the circuit of FIG. 1. A clamping circuit 25 is coupled to modulator capacitor 35 and is activated when the voltage $V_m$ across modulator capacitor 35 exceeds a predetermined level. The clamping circuit comprises a diode 50 coupled between modulator capacitor 35 at terminal 40 and the source of supply voltage $V_0$ at terminal 45. The voltage $V_0$ functions as a reference voltage for activating the diode clamp. Should the modulator voltage under fault operating conditions increase to one diode voltage drop above the reference voltage level of $V_0$, diode 50 becomes conductive, clamping modulator capacitor 35 to terminal 45 and preventing the modulator voltage $V_m$ from substantially exceeding the voltage $V_0$.

FIGS. 4a–4g illustrate the open-circuit fault condition waveform of the currents and voltages of the circuit of FIG. 1 when the diode clamping arrangement for overstress protection embodying the invention is included. As illustrated in FIG. 4g, the voltage $V_m$ is clamped at approximately the voltage level $V_0$ during the interval $\Delta t$, preventing the overvoltage stressing of controllable shunt transistor 36. Furthermore, the peak current in damper diode 28 at the end of the trace interval near time $t_4$ when operating in the fault mode is substantially reduced, as noted by a comparison of FIGS. 4d and 3d. Still further, the peak collector current in horizontal output transistor 27 at the end of trace near time $t_4$ is also reduced, as noted by a comparison of FIGS. 4c and 3c. Still further, despite the reduced base drive, horizontal output transistor 27 does not tend to come out of saturation during the latter part of the horizontal trace interval because of the reduced collector current as noted by a comparison of FIGS. 4f and 3f.

As mentioned previously, because of the lowered resonant frequency of the current oscillation in flyback transformer primary winding 22a during flyback of the modulator current $i_m$, excess energy is transferred into the modulator retrace circuit and thus eventually into the modulator capacitor 35. With clamp diode 50 connected between terminal 40 and the $V_0$ supply terminal 45, this excess energy is now directed to supply terminal 45 when the voltage at terminal 40 exceeds the level $V_0$. This energy flows as a current in diode 50 during the interval $\Delta t$ of FIG. 4g rather than as additional current through shunt transistor 36. The clamping arrangement illustrated between terminal 40 and terminal 45 is therefore also useful with modulator control circuits other than that of control circuit 37. For example, where transistor 36 is replaced by a two stage emitter-follower transistor arrangement which attempts to keep the voltage waveform at terminal 40 tracking the bias signal 38 waveform, any excess shunt current flowing from modulator inductor 34 away from capacitor 35 is now directed to supply terminal 45 rather than through the emitter-follower transistor arrangement, thereby reducing dissipation and overcurrent stress.

What is claimed is:

1. A side pincushion correction circuit with overstress protection, comprising:
   a deflection winding;
   a trace capacitance coupled to said deflection winding for developing a trace voltage;
   first switching means for applying said trace voltage to said deflection winding to generate a deflection trace current in said deflection winding;
   a first retrace capacitance coupled to said deflection winding for generating a deflection retrace current in said deflection winding;
   a modulator inductance;
   a modulator capacitance coupled to said modulator inductance for developing a modulator voltage;
   second switching means for applying said modulator voltage to said modulator inductance to generate a sawtooth modulator current in said modulator inductance;
   a second retrace capacitance coupled to said modulator inductance for generating a retrace current in said modulator inductance;
   a source of operating voltage;
   means including a flyback transformer winding coupled to said source of operating voltage for charging said trace and modulator capacitances;
   controllable shunting means coupled to said modulator capacitance and responsive to bias voltages for developing a shunt current to control said trace and modulator voltages;
   means for applying to said controllable shunting means a vertical rate bias voltage to vary said shunt current at a vertical rate to provide side pincushion correction;
   a source of reference voltage; and
   means for clamping said modulator capacitance to said source of reference voltage to bypass current from said modulator capacitance when the voltage thereacross exceeds a predetermined level.

2. A circuit according to claim 1 wherein said controllable shunting means comprises a transistor arrangement having a main current conducting path in parallel with said modulator capacitance.

3. A circuit according to claim 2 including means for applying an adjustable bias voltage to said transistor arrangement to provide amplitude control of said deflection trace current.

4. A circuit according to claims 1, 2, or 3 wherein said clamping means comprises a diode coupled between said modulator capacitance and said source of reference voltage.

5. A circuit according to claim 4 wherein said first switching means comprises a horizontal output transistor conducting said deflection trace current during the latter portion of the deflection trace interval and a damper diode conducting said deflection trace current during the former portion of the deflection trace interval and wherein said second switching means comprises a second diode coupled to said deflection winding and to said modulator inductance.

* * * * *